United States Patent
Tanaka

(10) Patent No.: US 8,004,731 B2
(45) Date of Patent: Aug. 23, 2011

(54) IMAGE FORMING APPARATUS

(75) Inventor: Kunihiko Tanaka, Osaka (JP)

(73) Assignee: Kyocera Mita Corporation (JP)

( * ) Notice: Subject to any disclaimer, the term of this patent is extended or adjusted under 35 U.S.C. 154(b) by 306 days.

(21) Appl. No.: 12/030,968

(22) Filed: Feb. 14, 2008

(65) Prior Publication Data

US 2008/0204830 A1 Aug. 28, 2008

(30) Foreign Application Priority Data

Feb. 28, 2007 (JP) ................. 2007-049052

(51) Int. Cl.
*H04N 1/46* (2006.01)
*H04N 1/60* (2006.01)
*G06K 15/00* (2006.01)
*G06K 9/00* (2006.01)
*G06K 9/34* (2006.01)
*G06K 9/36* (2006.01)

(52) U.S. Cl. ....... 358/530; 358/3.28; 358/1.9; 358/1.18; 382/100; 382/135; 382/176; 382/177; 382/290; 382/291; 382/292; 382/232

(58) Field of Classification Search ............... 358/530, 358/3.28, 447, 461, 463, 1.9, 1.18, 1.14, 358/540; 382/135, 100, 254–275, 218, 176, 382/177, 290, 291, 292, 232
See application file for complete search history.

(56) References Cited

U.S. PATENT DOCUMENTS

| 7,058,215 B2 * | 6/2006 | Ikeda et al. ............... 382/135 |
| 2003/0007661 A1 * | 1/2003 | Noguchi ............... 382/100 |
| 2005/0128522 A1 | 6/2005 | Ohmori |

FOREIGN PATENT DOCUMENTS

| JP | 6-62217 | 3/1994 |
| JP | 07336503 | 12/1995 |
| JP | 11-268368 | 10/1999 |
| JP | 2000137728 | 5/2000 |
| JP | 2001-298607 | 10/2001 |
| JP | 2005-39453 | 2/2005 |
| JP | 2005-254774 | 9/2005 |

* cited by examiner

*Primary Examiner* — Charlotte M Baker
(74) *Attorney, Agent, or Firm* — Gerald E. Hespos; Michael J. Porco

(57) ABSTRACT

An image forming apparatus is provided which includes: an image acquisition section (110) which reads an original and acquires an original image; a specific-pattern storage section (141) which stores a specific pattern which expresses, using a dot pattern, apparatus identification information for identifying an apparatus that prints the original image on a sheet of recording paper; an extraction section (132) which extracts an actual image area except a blank area in the original image, and base on the extracted actual image area, extracts a specific area corresponding to an area for printing the specific pattern; and a print section (150) which prints the specific pattern within the actual image area, using a yellow toner.

3 Claims, 7 Drawing Sheets

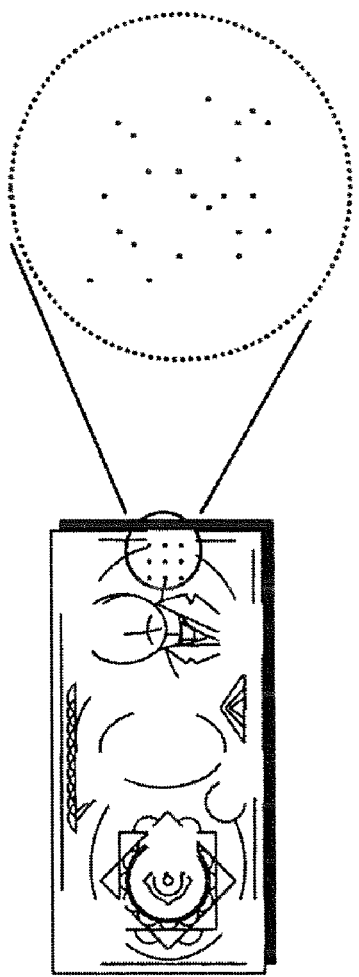
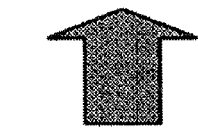
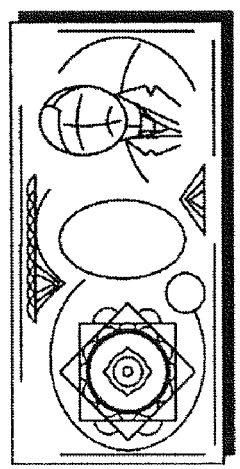
FIG. 3C
FIG. 3B
FIG. 3A

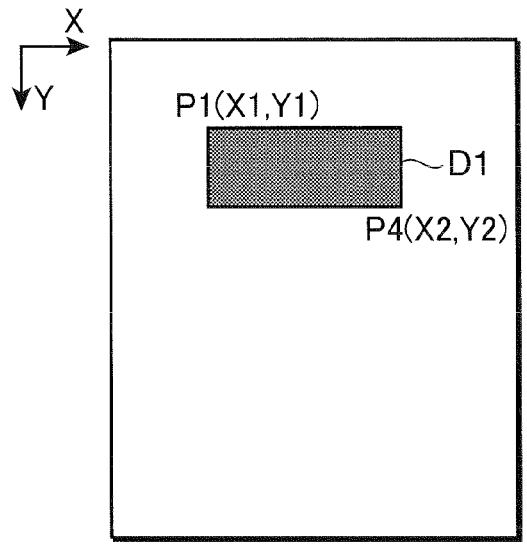
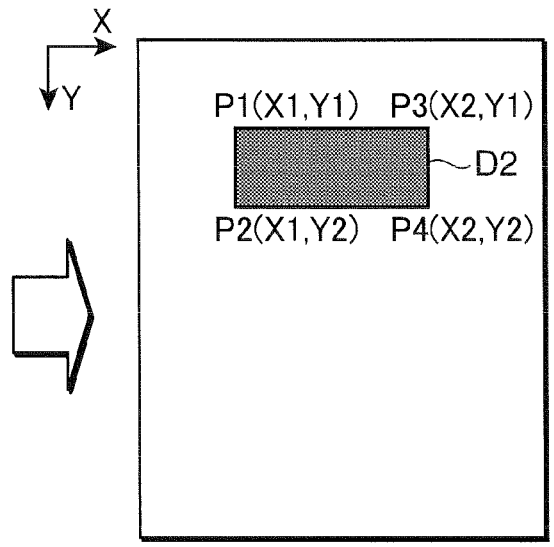
FIG. 5A
FIG. 5B
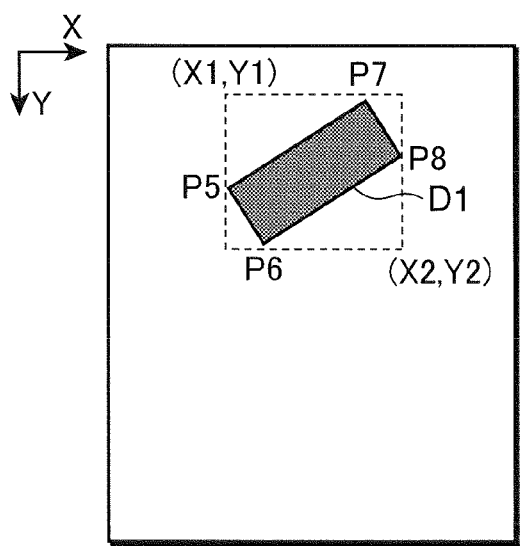
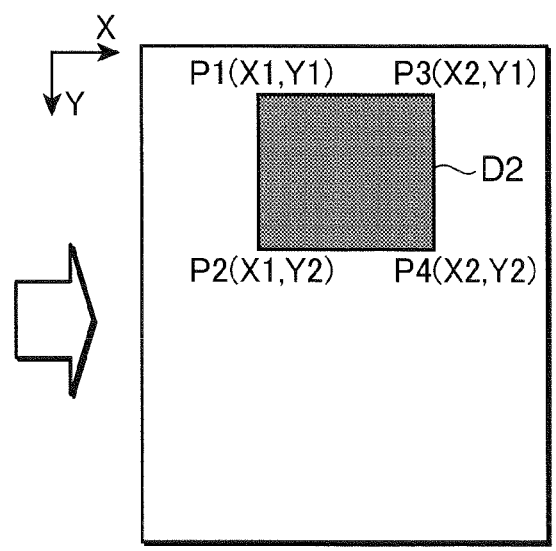
FIG. 6A
FIG. 6B

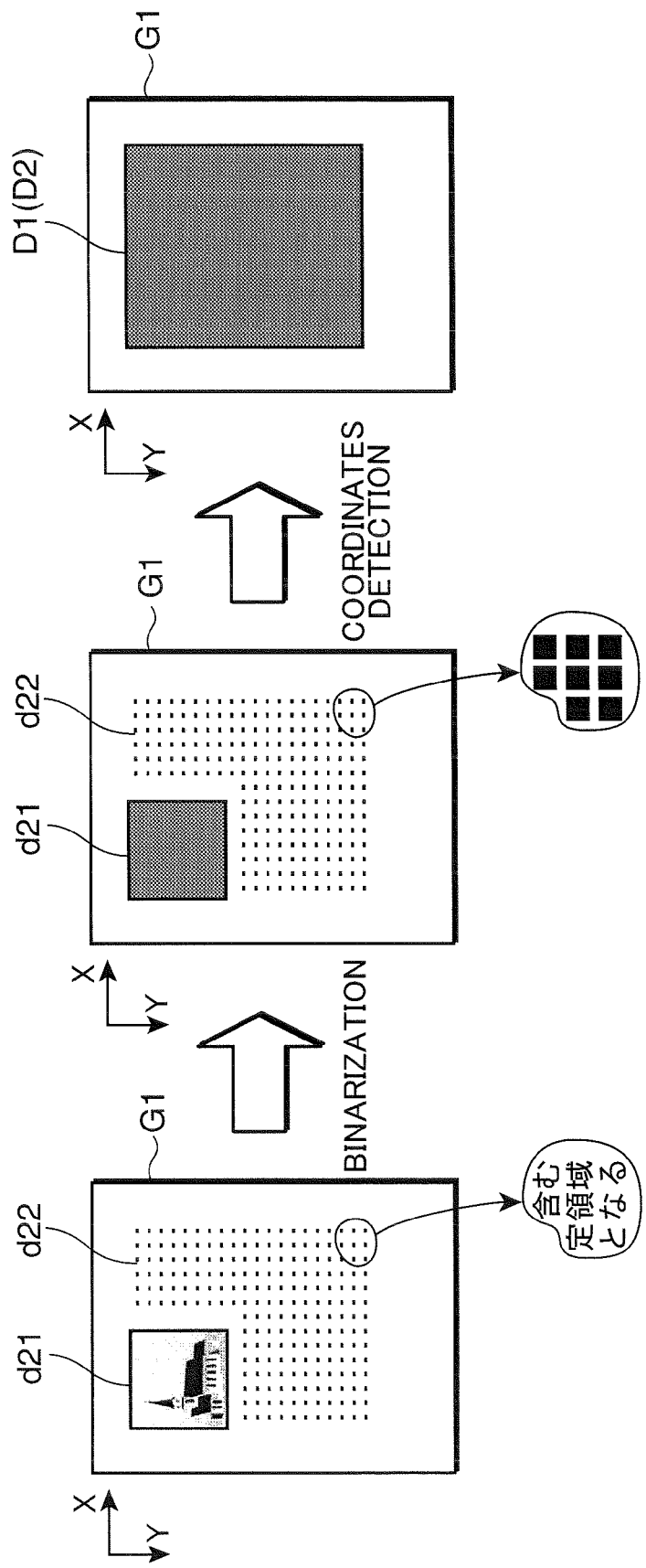

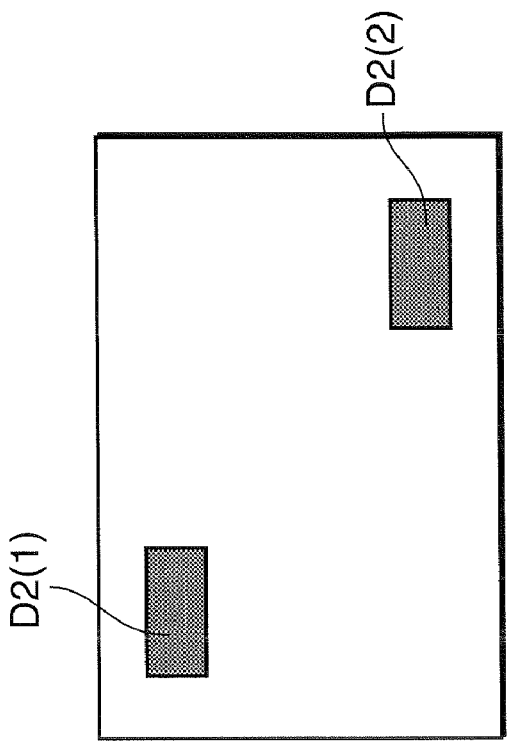
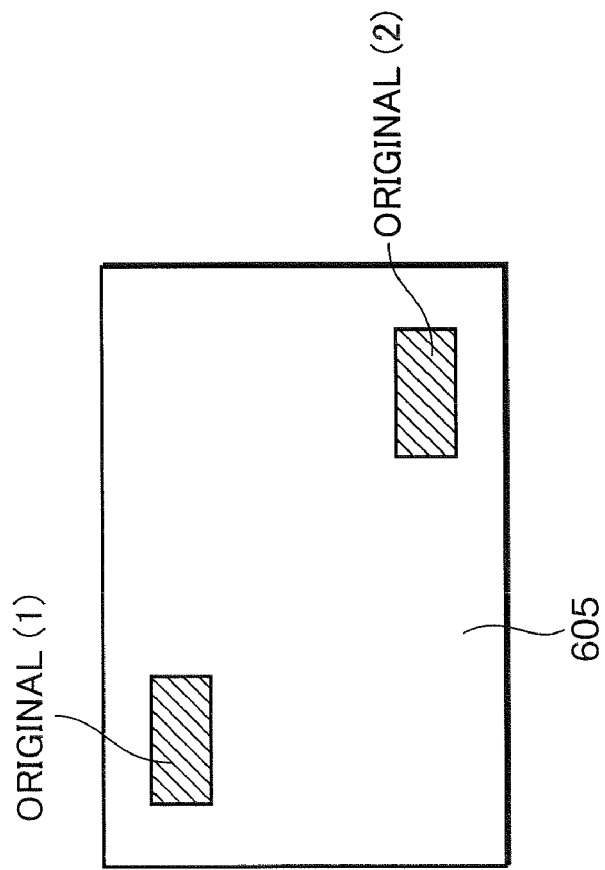

IMAGE FORMING APPARATUS

BACKGROUND OF THE INVENTION

1. Field of the Invention

The present invention relates to an image forming apparatus, such as a copying machine, a network printer and a digital complex machine.

2. Description of the Related Art

In recent years, there has been put to practical use an image forming apparatus such as a digital color copying machine which offers a precise copy of an original image and has a high picture quality. Along with this, a banknote, a valuable certificate or the like may be copied and easily counterfeited. As a forgery prevention technique for coping with such counterfeiting, a method is devised of: deciding whether or not an original that is set on an original-paper table is an original whose copy is prohibited, using an image processing such as pattern matching; and stopping copying it forcedly. However, in order to make a pattern match, all the characteristics of a copy-prohibition original such as a banknote, a valuable certificate, a traveler's check, a bank-account check and an official document all over the world have to be stored in a storage unit. This requires a large-capacity storage unit. Besides, if pattern matching is conducted every time each original is read, the time taken for reading them becomes far longer. This makes it practically difficult to adopt the above described forgery prevention technique in an image forming apparatus.

Therefore, a conventional image forming apparatus is known which has a function of: writing, in a copy, a specific pattern which expresses, using a dot pattern hard to visually confirm, information for identifying an apparatus which printed the corresponding copy, for example, information (i.e., the apparatus identification information) including the apparatus' manufacturer name, type name, serial number, copying date or the like; and thereby, identifying the apparatus which printed the corresponding copy.

However, in this image forming apparatus, there is a disadvantage in that such a specific pattern becomes conspicuous in a highlight part. Therefore, Patent Document 1 (e.g., in Paragraph [0008] of Japanese Patent Laid-Open No. 6-62217 specification) discloses an image forming apparatus which is capable of lowering the intensity of a specific pattern in a highlight part where a person is sensitive to a shade difference and heightening the intensity of the specific pattern in a shadow part where a person is insensitive so that the person can read the specific pattern certainly within any shade range while making the specific pattern inconspicuous.

In addition, in the above described conventional image forming apparatus, such a specific pattern is usually printed using a specific toner with a light color, for example, a yellow toner, which is hard to visually confirm. But this presents a disadvantage in that the consumption of this yellow toner increases. Therefore, Patent Document 2 (Japanese Patent Laid-Open No. 2005-254774 specification) discloses, taking into account the fact that a sheet of recording paper such as reused paper whose reverse side is not blank is extremely unlikely to be used for counterfeiting, an art of extracting the fact that the recording paper's reverse side is blank or not, and if it is not blank, not writing the specific pattern, so that this specific toner will be less consumed.

Furthermore, different from a sheet of paper having a regular size such as A4 and B5, a sheet of copy-prohibition original paper such as a banknote can be set in various positions on a sheet of contact glass. Hence, if the writing area of such a specific pattern is set to a specific area on recording paper, then the specific pattern cannot be written within the area where the copy-prohibition original is printed.

However, in the arts of Patent Document 1 and Patent Document 2, no measure is taken to print the specific pattern within the area where such a copy-prohibition original is printed. Therefore, in order to print the specific pattern within the area where the copy-prohibition original is in print, the specific pattern needs to be repeatedly printed over the whole surface of the recording paper. This raises a disadvantage in that the consumption of a specific toner increases.

SUMMARY OF THE INVENTION

It is an object of the present invention to provide an image forming apparatus which is capable of printing a specific pattern within an area where a copy-prohibition original is printed while saving the consumption of a toner used for printing the specific pattern.

An image forming apparatus according to the present invention, comprising: an image acquiring unit for reading an original and acquiring an original image; a printing unit for printing in color an original image acquired by the image acquiring unit on a sheet of recording paper, using a plurality of colored toners; a storing unit for storing a specific pattern which expresses, using a dot pattern, apparatus identification information for identifying an apparatus which prints the original image on a sheet of recording paper; and an extracting unit for extracting an actual image area except a blank area in the original image, and base on the extracted actual image area, extracting a specific area corresponding to an area for printing the specific pattern, wherein the printing unit prints the specific pattern within the specific area, using a predetermined colored toner for printing the specific pattern.

According to this configuration, an actual image area which does not include a blank area in the original image is extracted, and base on the extracted actual image area, a specific area for printing the specific pattern is extracted. Using a predetermined colored toner for printing the specific pattern, the specific pattern is printed within the specific area. Therefore, the specific pattern can be more precisely printed within an area where an original whose copy is prohibited is put in print. This makes it possible to prevent the copy-prohibition original paper from being forged. Besides, the specific pattern is printed only within the specific area, so that the consumption of a toner used for printing the specific pattern can be saved, compared with the case where the specific pattern is printed over the entire surface of the recording paper.

These and other objects, features and advantages of the present invention will become more apparent upon reading of the following detailed description along with the accompanied drawings.

BRIEF DESCRIPTION OF DRAWINGS

FIG. 3A is a pictorial view of an original image. FIG. 3B is a pictorial view of an image obtained by synthesizing the original image and a specific pattern. FIG. 3C is a pictorial view of the specific pattern.

FIG. 5A is an illustration, showing an actual image area in a processing by an extraction section. FIG. 5B is an illustration, showing a specific area.

FIG. 6A is an illustration, showing an actual image area in the processing by the extraction section. FIG. 6B is an illustration, showing a specific area.

FIG. 7A is an illustration, showing an original image G1 acquired by reading an original including a picture area and a character area in a processing by an extraction section 132. FIG. 7B is an illustration, showing the original image G1 subjected to a binary processing. FIG. 7C is an illustration, showing an actual image area D1 and a specific area D2.

FIG. 8A is an illustration, showing that two different original-paper sheets are placed on the contact glass of the image forming apparatus. FIG. 8B is an illustration, showing how to set a specific area in the case of FIG. 8A.

DETAILED DESCRIPTION OF THE PREFERRED EMBODIMENTS

Figure 1:
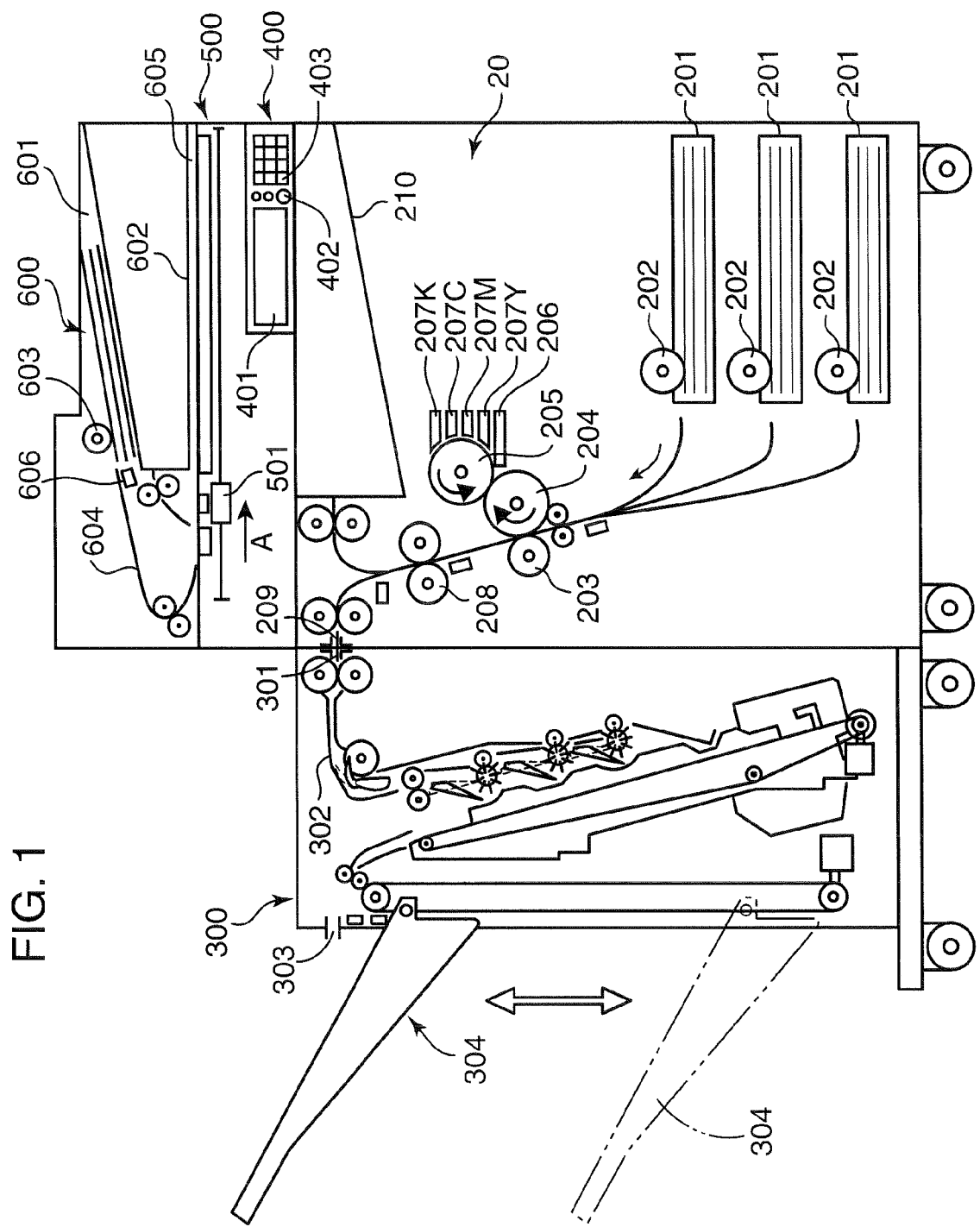
FIG. 1 is a schematic side view of an image forming apparatus according to the present invention, mainly showing its mechanical configuration.

Hereinafter, an image forming apparatus according to an embodiment of the present invention will be described with reference to the attached drawings. FIG. 1 is a schematic side view of the image forming apparatus according to this embodiment, mainly showing its mechanical configuration. The image forming apparatus is configured by: a body portion 20; a paper post-processing portion 300 which is provided on the left side of the body portion 20; an operation portion 400 in which a user inputs various operation commands or the like; an original reading portion 500 which is provided in the upper part of the body portion 20; and an original-paper feed portion 600 which is provided above the original reading portion 500.

The operation portion 400 includes an operation panel 401, a start key 402, a ten key 403 and the like. The operation panel 401 displays various operation images, and it also displays various operation buttons or the like for the user inputting various operation commands. The start key 402 is used for the user inputting a printing command or the like. The ten key 403 is used for inputting the number of prints or the like.

The original-paper feed portion 600 includes an original-paper placement portion 601, an original-paper placement portion 601, an original-paper discharge portion 602, a paper feed roller 603 and an original-paper forwarding portion 604, and a sheet of contact glass 605 and the like. The original reading portion 500 includes a scanner 501 and the like. The paper feed roller 603 delivers a sheet of original paper set on the original-paper placement portion 601. The original-paper forwarding portion 604 forwards the delivered sheet of original paper one by one onto the scanner 501. The scanner 501 reads the forwarded sheet of original paper one after another, and the read sheet of original paper is discharged to the original-paper discharge portion 602. When reading a sheet of original paper placed on the contact glass 605, the scanner 501 slides this sheet of original paper in a direction A and reads it. Besides, the scanner 501 is formed by a line image sensor in which a plurality of (i.e., M) photoelectric conversion devices such as a CCD are arrayed in the directions (i.e., the horizontal scanning directions) perpendicular to the paper surface of this figure. Herein, the inmost photoelectric conversion device in the directions perpendicular to the paper surface is the first photoelectric conversion device and the nearest photoelectric conversion device is the Mth photoelectric conversion device.

The body portion 20 includes a plurality of paper feed cassettes 201, a plurality of paper feed rollers 202, a transfer roller 203, an intermediate transfer-body roller 204, a photosensitive drum 205, an exposure unit 206, development units 207Y, 207M, 207C and 207K for each color of yellow, magenta, cyan and black, a fixation roller 208, a discharge slit 209, and a discharge tray 210.

The photosensitive drum 205 is rotated in the direction of the arrow and is uniformly electrified by a charging unit (not shown). The exposure unit 206 converts, into a laser beam, a modulation signal generated based on image data on the original read in the original reading portion 500. Then, it outputs this laser beam and forms an electrostatic latent image with each color on the photosensitive drum 205. The development units 207Y, 207M, 207C and 207K supplies a developer for each color to the photosensitive drum 205 and forms a toner image with each color.

To the intermediate transfer-body roller 204, the toner image in each color is transferred from the photosensitive drum 205, so that a colored toner image is formed on the intermediate transfer-body roller 204.

On the other hand, the paper feed roller 202 pulls out a sheet of recording paper from the paper feed cassette 201 having recording paper in store. Then, it forwards this sheet of recording paper to the transfer roller 203. The transfer roller 203 transfers, onto the forwarded recording paper, the toner image on the intermediate transfer-body roller 204. The sheet of recording paper with the transferred toner image is forwarded to the fixation roller 208. The fixation roller 208 heats and fixes the transferred toner image on the sheet of recording paper. Thereafter, the sheet of recording paper is forwarded to the discharge slit 209 and is carried into the paper post-processing portion 300. Besides, the sheet of recording paper is also discharge, if necessary, to the discharge tray 210.

The paper post-processing portion 300 includes a carriage-in slit 301, a recording-paper forwarding portion 302, a carriage-out slit 303, a stack tray 304 and the like. The recording-paper forwarding portion 302 forwards, one by one, each sheet of recording paper carried into the carriage-in slit 301 from the discharge slit 209. Finally, it discharges the sheet of recording paper from the carriage-out slit 303 onto the stack tray 304. The stack tray 304 is designed to move up and down in the directions of the arrow in accordance with the number of stacked sheets of recording paper carried out from the carriage-out slit 303.

Figure 2:
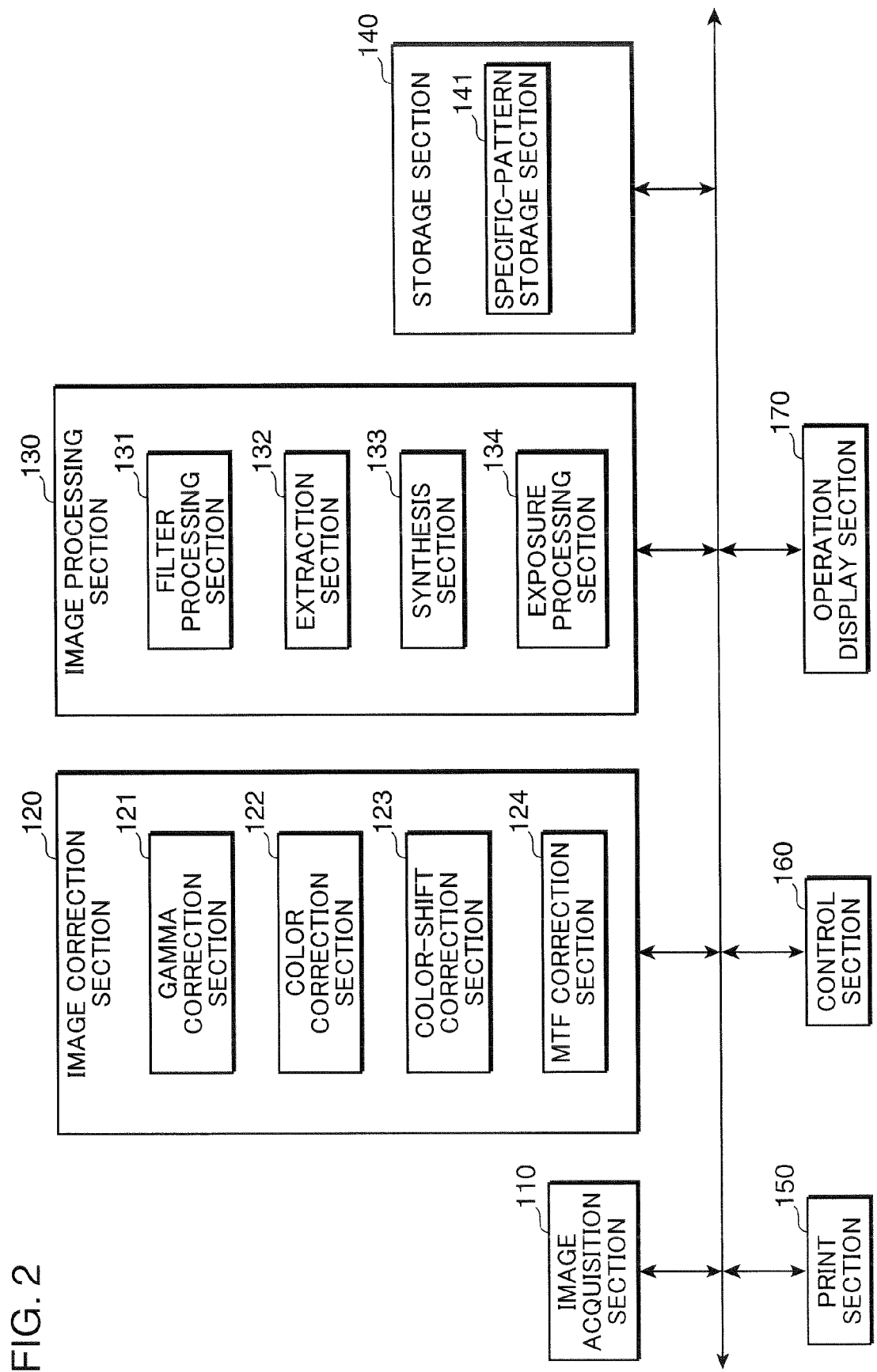
FIG. 2 is a block diagram, showing the electrical configuration of the image forming apparatus shown in FIG. 1.

FIG. 2 is a block diagram, showing the electrical configuration of the image forming apparatus shown in FIG. 1. This image forming apparatus includes: an image acquisition section 110; an image correction section 120; an image processing section 130; a storage section 140; a print section 150; a control section 160; and an operation display section 170. The image acquisition section 110 is formed by the original reading portion 500 shown in FIG. 1. It reads, using the scanner 501, an original from a sheet of original paper placed on the original-paper placement portion 601 or the contact glass 605, and acquires an original image. Herein, the original image is made up of three color components of red (or R), green (or G) and blue (or B). Then, it is made up of pixels which are arrayed in a matrix form of M (i.e., M is a positive integer) line×N (i.e., N is a positive integer) row. Each pixel is expressed using 256 gradations of 0 to 255, and the gradation becomes higher as it comes closer to white while the gradation becomes lower as it comes closer to black. Hence, the original image is a multi-valued image. Besides, the original image's line directions are set to the longitudinal directions and the original image's row directions are set to the lateral directions. The longitudinal coordinate increases as the line number rises while the lateral coordinate increases as the row number rises.

Furthermore, in the original image, the line of image data located in the first row in the lateral directions is image data to be read immediately after a reading operation starts for a sheet of original paper. On the other hand, the line of image data located in the Nth row in the lateral directions is image data to be read immediately before a reading operation ends for a sheet of original paper. Moreover, in the original image, the line of image data located in the first row in the longitudinal directions is image data which is read by the above described first photoelectric conversion device. On the other hand, the line of image data located in the Mth row in the longitudinal directions is image data which is read by the above described Mth photoelectric conversion device.

The image correction section 120 is formed by a dedicated hardware circuit such as an ASIC. It includes a gamma correction section 121, a color correction section 122, a color-shift correction section 123, and an MTF (or modulation transfer function) correction section 124. The gamma correction section 121 makes a gamma correction for bringing the linearity of an original image acquired by the image acquisition section 110 close to a human visual sensation. The color correction section 122 sets each bias voltage of the development units 207Y to 207K so that each toner image of yellow, magenta, cyan and black is formed at a predetermined shade level. In order to rectify a color shift caused by a shift in each toner image of yellow, magenta, cyan and black, the color-shift correction section 123 corrects each color-component image of yellow, cyan, magenta and black which make up an output image generated by an exposure processing section 134.

The MTF correction section 124 corrects an original image whose gamma correction is made by the gamma correction section 121, so that a "fade-out" in a ray of light incident on the scanner 501 which is produced by a lens (not shown) can be rectified.

The image processing section 130 is formed by a dedicated hardware circuit such as an ASIC. It includes a filter processing section 131, an extraction section 132, a synthesis section 133 and an exposure processing section 134. In order to eliminate a noise or the like included in an original image acquired by the image acquisition section 110, the filter processing section 131 executes a filter processing for the original image whose correction is made by the MTF correction section 124.

The extraction section 132 extracts an actual image area except a blank area from an original image whose correction is made by the MTF correction section 124. On the basis of the extracted actual image area, it extracts a specific area for printing a specific pattern. Specifically, the extraction section 132 extracts the actual image area other than the blank area by making binary the original image acquired by the image acquisition section 110, and extracts, as the specific area, a rectangular area enclosed with four points which are defined by the minimum value on the lateral coordinate, the maximum value on the longitudinal coordinate, the maximum value on the lateral coordinate and the minimum value on the longitudinal coordinate of the extracted actual image area. Herein, the extraction section 132 compares a threshold value set in advance to a value desirable for extracting the blank area and the gradation value of each pixel which makes up the original image. If each pixel whose gradation value is greater than the threshold value, then they are set to "0. In contrast, each pixel whose gradation value is equal to, or smaller than, the threshold value, then they are set to "1". Thereby, the original image becomes binary. As the threshold value, preferably, a value of 240 to 250 or so should be adopted, taking into account the fact that the gradation value of the white part of an original, the gradation value of a background plate located behind an original when reading the original, or the like, is not necessarily the maximum gradation of "255".

The synthesis section 133 synthesizes an original image whose filter processing is executed by the filter processing section 131 and a specific pattern so that a specific pattern can be printed in a specific area extracted by the extraction section 132.

The exposure processing section 134 converts the image made up of the color components of R, G and B which is obtained by this synthesis of the synthesis section 133 into an image made up of the color components of yellow, magenta, cyan and black. Then, it dithers each color-component image and generates an output image.

The storage section 140 is formed by a non-volatile storage unit and includes a specific-pattern storage section 141. The specific-pattern storage section 141 stores a specific pattern which expresses, using a dot pattern, apparatus identification information for identifying an apparatus which printed an original image on a sheet of recording paper.

FIG. 3A is a pictorial view of an original image; FIG. 3B is a pictorial view of an image obtained by synthesizing the original image and a specific pattern; and FIG. 3C is a pictorial view of the specific pattern. As shown in FIG. 3C, the specific pattern corresponds to a dot pattern like Braille. It indicates apparatus identification information which includes at least any one of the manufacturer name, type name, serial number and copying date of an image forming apparatus. Herein, as the dot pattern used for a specific pattern, a dot pattern which means the numerals of "1" to "9" or each character such as the alphabet of "a" to "z" and "A" to "Z" is determined in advance. The specific pattern expresses apparatus identification information by combining such dot patterns. On the other hand, in the image forming apparatus which reads out from a sheet of recording paper on which such a specific pattern is printed, a dot pattern representing each character is stored, so that it can recognize apparatus identification information by making a pattern match.

The print section 150 is formed by the transfer roller 203, the intermediate transfer-body roller 204, the photosensitive drum 205, the exposure unit 206 and the development units 207Y to 207K which are shown in FIG. 1. Under the control of the control section 160, it forms an output image generated by the exposure processing section 134 on a sheet of recording paper.

The control section 160 is formed by a microcomputer such as a CPU, a ROM and a RAM and governs the whole control of the image forming apparatus. The operation display section 170 is formed by the operation portion 400 shown in FIG. 1 and accepts various operation commands given by a user.

Figure 4:
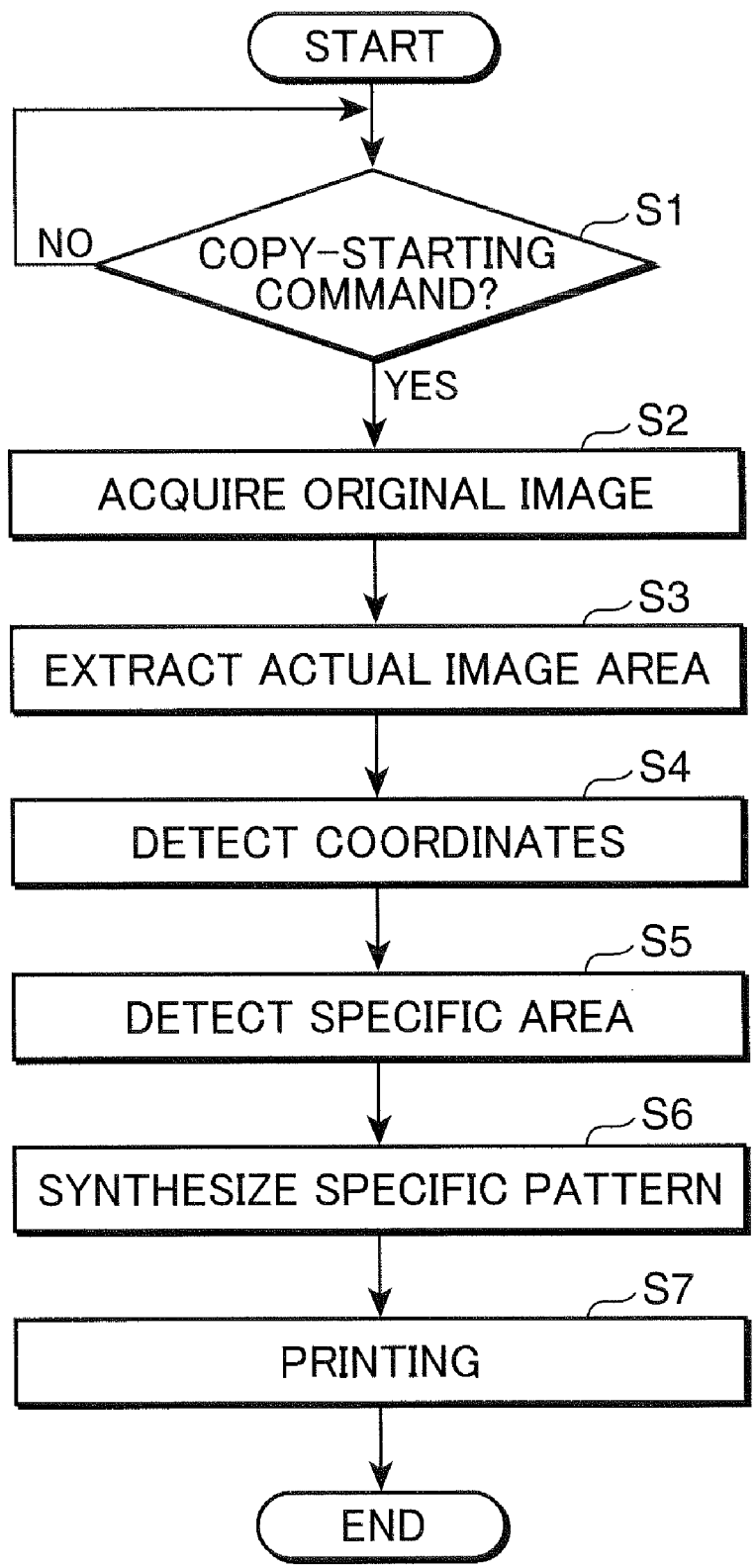
FIG. 4 is a flow chart, showing the operation of the image forming apparatus.

Next, an operation will be described of this image forming apparatus. FIG. 4 is a flow chart, showing the operation of the image forming apparatus. First, if the operation display section 170 accepts an operation command to start copying from a user (YES at a step S1), the image acquisition section 110 starts to read an original and acquires an original image (in a step S2). On the other hand, if the operation display section 170 does not accept an operation command to start copying from a user (NO at the step S1), the processing returns to the step S1.

Sequentially, in a step S3, the extraction section 132 gives a binary processing to the original image acquired by the image acquisition section 110. Then, it decides from the arrangement of pixels set to "1" whether each pixel set to "1" is a pixel which belongs to a picture area or a pixel which belongs to a character area. If the pixels come into the character area, then from the arrangement of each pixel, it separates each pixel in a unit of one character. Then, it applies a circumscribed rectangle to each separated character and sets a rectangular area obtained by giving a certain margin to the applied circumscribed rectangle as the background of each character. Thus, it extracts the total area of each character background as the character area. Then, it extracts the character area and the picture area as the actual image area. Incidentally, before the actual image area is extracted, the original image undergoes a gamma correction and an MTF correction by the gamma correction section 121 and the MTF correction section 124.

FIG. 5A is an illustration, showing an actual image area in a processing by the extraction section 132 and FIG. 5B is an illustration, showing a specific area. In FIGS. 5A and 5B, Y indicates the longitudinal directions and X indicates the lateral directions. The vertex on the upper left of an original image G1 corresponds to the origin. In FIG. 5A, such a strip-shaped image as shown in FIG. 3A is read by the image acquisition section 110 so that its longitudinal side is parallel to the X direction and its lateral side is parallel to the Y direction. Hence, a pixel P1 on the upper left of an actual image area D1 becomes the minimum values X1 and Y1 in the X direction and the Y direction while a pixel P4 on the lower right becomes the maximum values X2 and Y2 in the X direction and the Y direction.

On the other hand, in FIG. 6A, the strip-shaped image shown in FIG. 3A is read by the image acquisition section 110 so that its longitudinal side intersects the X direction. Hence, the coordinates of a pixel P5 on the upper left of an actual image area D1 becomes the minimum value X1 in the X direction, the coordinates of a pixel P6 on the lower left becomes the maximum value Y2 in the Y direction, the coordinates of a pixel P7 on the upper right becomes the minimum value Y1 in the Y direction, and the coordinates of a pixel P8 on the lower right becomes the maximum value X2.

Next, in a step S4, as shown in FIGS. 5A and 6A, the extraction section 132 detects the minimum value X1 of the X-direction coordinate of the actual image area D1, the maximum value X2 of the X-direction coordinate, the minimum value Y1 of the Y-direction coordinate and the maximum value Y2 of the Y-direction coordinate.

Sequentially, in a step S5, the extraction section 132 extracts, as a specific area D2, the rectangular area defined by the minimum value X1, Y1 and the maximum value X2, Y2 detected at the step S4. In FIG. 5B, the actual image area D1's longitudinal side is parallel to the X direction and its lateral side is parallel to the Y direction, and thus, the actual image area D1 is identical with the specific area D2.

In contrast, in FIG. 6B, the actual image area D1's longitudinal side intersects the X direction. Thus, a rectangular area which includes the actual image area D1 and whose longitudinal side is parallel to the X direction and its lateral side is parallel to the Y direction is extracted as the specific area D2.

FIG. 7A is an illustration, showing the original image G1 acquired by reading an original including a picture area and a character area in a processing by an extraction section 132. FIG. 7B is an illustration, showing the original image G1 subjected to a binary processing. FIG. 7C is an illustration, showing the actual image area D1 and the specific area D2.

The original image G1 shown in FIG. 7A includes a picture area d21 and a character area d22. Hence, if it is subjected to a binary processing, as shown in FIG. 7B, each pixel within the picture area d21 is set to "1"; among the pixels within the character area d22, each pixel expressing a character is set to "1" and each pixel expressing a white part is set to "0"; and each pixel which belongs to neither of the picture area d21 and the character area d22 is set to "0". Then, from the arrangement of pixels set to "1", a decision is made whether each pixel set to "1" is a pixel which belongs to the picture area d21 or a pixel which belongs to the character area d22. If the pixels come into the character area, then from the arrangement of each pixel, each pixel is divided in a unit of one character. Then, a circumscribed rectangle is applied to each divided character, and a rectangular area obtained by giving a certain margin to the applied circumscribed rectangle is set as the background of each character. Thus, the total area of each character background is extracted as the character area. Thereby, an area where the pixels of "0" are not arranged continuously so as to have a certain size or larger is not extracted as a blank area. Hence, the white part around a character is not supposed to be extracted as the blank area. Therefore, as shown in FIG. 7C, a rectangular area including the picture area d21 and the character area d22 is extracted as the actual image area D1. On the basis of this actual image area D1, the specific area D2 is designed to be extracted.

Next, in a step S6, the synthesis section 133 synthesizes the original image G1 whose filter processing is executed by the filter processing section 131 and a specific pattern stored in the specific-pattern storage section 141 so that the specific pattern can be printed in a predetermined position within the specific area D2 in the original image G1.

Herein, the synthesis section 133 may synthesize the specific pattern and the original image G1 so that the center of gravity of the specific pattern is positioned at the center of gravity of the specific area D2. Or, it may also synthesize the specific pattern and the original image G1 so that the specific pattern is positioned near the upper left, lower left, upper right and lower right of the specific area D2. Further, it may also synthesize the specific pattern and the original image G1 by enlarging or reducing the specific pattern according to the square measure of the specific area D2. If the actual image area D1 is largely shifted, then in order to print the specific pattern more certainly within the actual image area D1, it may also synthesize the specific pattern and the original image G1 in such a manner that the specific pattern is repeated time after time.

Sequentially, in a step S7, the exposure processing section 134 converts the original image G1 after the synthesis of the specific pattern into an image made up of the color components of yellow, cyan, magenta and black so that the specific pattern is expressed in yellow. Thereafter, it dithers each color-component image and generates an output image. Then, the print section 150 prints the generated output image on a sheet of recording paper.

As described so far, in this image forming apparatus, in the original image G1, the actual image area D1 which does not include the blank area is extracted. On the basis of the extracted actual image area D1, the specific area D2 for printing the specific pattern is extracted. Using a yellow toner, it is printed within the specific area D2. Therefore, the specific pattern can be more precisely printed within the actual image area D1 where an original whose copy is prohibited, such as a banknote, is put in print. This makes it possible to prevent the copy-prohibition original paper from being forged. Besides, the specific pattern is printed only within the specific area D2, so that the consumption of the yellow toner can be saved, compared with the case where the specific pattern is printed over the entire surface of the recording paper.

Incidentally, FIG. 8A shows an example of the case where two (or a plurality of) objects to be copied (i.e., sheets of original paper) are placed a threshold value or above apart from each other on the contact glass 605. In this case, as shown in FIG. 8B, a specific area D2(1) and a specific area D2(2) may be set to the positions which correspond to an object to be copied (i.e., a sheet of original paper 1) on the upper left and an object to be copied (i.e., a sheet of original paper 2) on the lower right. In this case, a pattern for identifying a unit is printed at the center of gravity of each specific area.

In further detail, the image acquisition section 110 acquires a first original image and a second original image which correspond to the first original paper (1) and the second original paper (2); the extraction section 132 extracts an actual image area except a blank area in each of the first original image and the second original image, and base on the extracted first actual-image area and second actual-image area, extracts the first specific area D2(1) and the second specific area D2(2) which correspond to an area for printing the specific pattern; and the print section 150 prints the specific pattern within each of the first specific area D2(1) and the second specific area D2(2), using a predetermined colored toner for printing the specific pattern.

It should be noted that the number of objects to be copied (i.e., sheets of original paper) not necessarily has to be limited, as described above, to two. For example, even if such objects are placed on the four corners of the contact glass 605, or even if five sheets of original paper are placed at random predetermined distances away from each other, then a specific area may also be set to the position which corresponds to each such object (i.e., sheet of original paper). In this case, a pattern for identifying a unit is printed within each specific area.

Hereinafter, a description will be given about a summary of the present invention. An image forming apparatus according to the present invention, comprising: an image acquiring means for reading an original and acquiring an original image; a printing means for printing in color an original image acquired by the image acquiring means on a sheet of recording paper, using a plurality of colored toners; a storing means for storing a specific pattern which expresses, using a dot pattern, apparatus identification information for identifying an apparatus which prints the original image on a sheet of recording paper; and an extracting means for extracting an actual image area except a blank area in the original image, and base on the extracted actual image area, extracting a specific area corresponding to an area for printing the specific pattern, wherein the printing means prints the specific pattern within the specific area, using a predetermined colored toner for printing the specific pattern.

According to this configuration, an actual image area which does not include a blank area in the original image is extracted, and base on the extracted actual image area, a specific area for printing the specific pattern is extracted. Using a predetermined colored toner for printing the specific pattern, the specific pattern is printed within the specific area. Therefore, the specific pattern can be more precisely printed within an area where an original whose copy is prohibited is put in print. This makes it possible to prevent the copy-prohibition original paper from being forged. Besides, the specific pattern is printed only within the specific area, so that the consumption of a toner used for printing the specific pattern can be saved, compared with the case where the specific pattern is printed over the entire surface of the recording paper.

Furthermore, it is preferable that the extracting means extract the actual image area except the blank area by making the original image binary, and extract, as the specific area, a rectangular area enclosed with four points which are defined by the minimum value on the lateral coordinate, the maximum value on the longitudinal coordinate, the maximum value on the lateral coordinate and the minimum value on the longitudinal coordinate of the extracted actual image area.

According to this configuration, the actual image area other than the blank area is extracted through a binary processing, and a rectangular area enclosed with four points which are defined by the minimum value on the lateral coordinate, the maximum value on the longitudinal coordinate, the maximum value on the lateral coordinate and the minimum value on the longitudinal coordinate of the extracted actual image area is extracted as the specific area. Therefore, the specific area can be extracted through a relatively simple processing, thereby heightening the processing speed. Particularly, even if a sheet of such copy-prohibition original paper is set aslant on the contact glass, the specific area is extracted so as to include the area in which the copy-prohibition original paper is printed. This makes it possible to print the specific pattern more precisely within the copy-prohibition original paper's print area.

Moreover, preferably, the printing means should print the specific pattern within the actual image area so that the center of gravity of the specific pattern is positioned at the center of gravity of the specific area.

According to this configuration, the specific pattern is printed within the actual image area so that the center of gravity of the specific pattern is positioned at the center of gravity of the specific area. Therefore, even if the difference between the specific area and the actual image area is large, the specific pattern can be more precisely printed within the actual image area.

This application is based on Japanese patent application serial No. 2007-049052 filed in Japan Patent Office on Feb. 28, 2007, the contents of which are hereby incorporated by reference.

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image forming apparatus, comprising:
 a contact glass on which a sheet of original paper is placed;
 an image acquiring unit for reading the original paper and acquiring an original image;
 a printing unit for printing in color an original image acquired by the image acquiring unit on a sheet of recording paper, using a plurality of colored toners;
 a storing unit for storing a specific pattern which expresses, using a dot pattern, apparatus identification information for identifying an apparatus which prints the original image on a sheet of recording paper; and
 an extracting unit for extracting an actual image area except a blank area in the original image, and based on the extracted actual image area, extracting a specific area corresponding to an area for printing the specific pattern,
 wherein the printing unit prints the specific pattern within the specific area, using a predetermined colored toner for printing the specific pattern, and
 wherein if a first original paper and a second original paper are placed at a predetermined interval on the contact glass: the image acquiring unit acquires a first original image and a second original image which correspond to the first original paper and the second original paper; the extracting unit extracts an actual image area except a blank area in each of the first original image and the second original image, and based on the extracted first actual-image area and second actual-image area, extracts a first specific area and a second specific area which correspond to an area for printing the specific pattern; and the printing unit prints the specific pattern within each of the first specific area and the second specific area, using a predetermined colored toner for printing the specific pattern.

2. An image forming apparatus, comprising:

an image acquiring unit for reading an original and acquiring an original image;

a printing unit for printing in color an original image acquired by the image acquiring unit on a sheet of recording paper, using a plurality of colored toners;

a storing unit for storing a specific pattern which expresses, using a dot pattern, apparatus identification information for identifying an apparatus which prints the original image on a sheet of recording paper; and an extracting unit for extracting an actual image area except a blank area in the original image, and based on the extracted actual image area, extracting a specific area corresponding to an area for printing the specific pattern, wherein the printing unit prints the specific pattern within the specific area, using a predetermined colored toner for printing the specific patternso that the center of gravity of the specific pattern is positioned at the center of gravity of the specific area, and wherein the extracting unit extracts the actual image area by making the original image binary, and extracts, as the specific area, a rectangular area enclosed with four points which are defined by the minimum value on the lateral coordinate, the maximum value on the longitudinal coordinate, the maximum value on the lateral coordinate and the minimum value on the longitudinal coordinate of the extracted actual image area.

3. A method for printing a specific pattern in an image forming apparatus which includes: an image acquiring unit for reading an original and acquiring an original image; a printing unit for printing in color an original image acquired by the image acquiring unit on a sheet of recording paper, using a plurality of colored toners; and a storing unit for storing the specific pattern which expresses, using a dot pattern, apparatus identification information for identifying an apparatus which prints the original image on a sheet of recording paper, comprising the steps of:

extracting an actual image area except a blank area in the original image;

extracting a specific area corresponding to an area for printing the specific pattern, based on the extracted actual image area, the extracting includes: a sub-step of extracting the actual image area by making the original image binary; and a sub-step of extracting, as the specific area, a rectangular area enclosed with four points which are defined by the minimum value on the lateral coordinate, the maximum value on the longitudinal coordinate, the maximum value on the lateral coordinate and the minimum value on the longitudinal coordinate of the extracted actual image area; and printing the specific pattern within the specific area by the printing unit, using a predetermined colored toner for printing the specific pattern, the specific pattern being printed within the specific area so that the center of gravity of the specific pattern is positioned at the center of gravity of the specific area.

* * * * *